United States Patent [19]

Fourrey et al.

[11] Patent Number: 4,495,833
[45] Date of Patent: Jan. 29, 1985

[54] STEERING COLUMN ADJUSTABLE IN HEIGHT

[75] Inventors: François Fourrey, Montbeliard; Jean-Francois Mauffrey, Danjoutin, both of France

[73] Assignee: Cycles Peugeot, Valentigney, France

[21] Appl. No.: 307,266

[22] Filed: Sep. 30, 1981

[30] Foreign Application Priority Data

Oct. 13, 1980 [FR] France ............... 80 21809

[51] Int. Cl.³ .............. B62D 1/18; G05G 5/18
[52] U.S. Cl. .................... 74/493; 74/535; 74/536; 280/775
[58] Field of Search ........... 74/493, 535, 536; 280/775

[56] References Cited

U.S. PATENT DOCUMENTS

| | | | |
|---|---|---|---|
| 2,784,770 | 3/1957 | Herr | 74/536 X |
| 3,355,962 | 12/1967 | Gerdes et al. | 280/775 X |
| 3,487,711 | 1/1970 | Sippel | 280/775 X |
| 4,078,448 | 3/1978 | Naka | 74/493 |

Primary Examiner—Allan D. Herrmann
Attorney, Agent, or Firm—Sughrue, Mion, Zinn, Macpeak and Seas

[57] ABSTRACT

The steering column is mounted to be pivotable about the same axis as the steering shaft which extends through the column. The column carries a support plate for associated controls which is locked on the casing tube of the column which is pivotally mounted on a bracket for fixing the whole of the column to the body of the vehicle. An unlocking lever, pivotally mounted in the vicinity of the steering column, is extended by a curved rod which terminates in the vicinity of the steering wheel. A first travel of the lever puts an arm in contact with a pivotal cam, then a second travel of the lever pivots the cam and unlocks the column which can then be pivoted about its pivotal mounting on the bracket and adjusted to the desired height.

11 Claims, 8 Drawing Figures

STEERING COLUMN ADJUSTABLE IN HEIGHT

DESCRIPTION

The comfort of the driver of an automobile vehicle is now considered to be an important factor in the safety of the driving of this vehicle. This is why a number of vehicles are at present provided with a steering column which is adjustable in height, ie. with a column which is pivotable about a pivot point which is more or less remote from the steering wheel, the best adjustment being achieved when the column pivots about the articulation axis of the steering shaft which extends therethrough.

A locking device is then mounted in the region of this articulation system and enables the driver to adjust the position of the steering column before driving off in the vehicle. The position of the steering wheel may thus be adapted to the size of the driver. However, it has been found that this adjustment is insufficient to afford a real comfort since the driving position varies in accordance with the drivers and may even sometimes vary in the course of the same journey.

An object of the present invention it to overcome these drawbacks and to provide a steering column which may be adjusted at any time by the driver into the exact driving position.

The invention provides a steering column through which extends a steering shaft which is articulated at its lower end and is rendered rigid with a support plate which is for associated controls and is mounted on a fixed support to pivot about an axis which is coaxial with the articulation of the steering shaft. This column includes a device for locking the plate with respect to the fixed support, an unlocking cranked lever which pivots in a direction parallel to the plate between a position of rest spaced away from the locking device, a position of engagement with the locking device and an unlocking position, said lever being elastically biased to the position of rest corresponding to the locking of the column.

In such an arrangement, the cranked lever is preferably extended by a control rod which is at a slight distance from the steering wheel in its position of rest so that it does not hinder the driving of the vehicle but which is brought into the vicinity of the steering wheel upon the pivoting of the lever between the position of rest and the position of engagement with the locking device. Consequently, the unlocking displacement may be achieved by a driver who has his hands exactly in the driving position. The adjustment of the column is then achieved in the driving position, ie. in accordance with the latter.

In a preferred embodiment, the support plate for the associated controls is connected to the fixed support of the column by a double articulation compass system. The column thus has considerable resistance to lateral forces which are consequently not liable to block the locking device.

The ensuing description of an embodiment of the invention, given solely by way of example and shown in the accompanying drawings, will bring out the advantages and features of the invention.

As shown more particularly in FIGS. 1 to 4, the steering column of the invention comprises a tube 1 through which extends in the conventional manner a first steering shaft portion Sa which carries at its upper end a steering wheel 2. At its lower end, the tube 1 is pivotally mounted on a bracket or frame 4 constituting a support for fixing the column to the vehicle. For this purpose, two metal sheets 6 are fixed at two diametrally opposed points of the tube 1 and have extending therethrough a pin 7 which also extends through a formed-over flange 8 of the bracket 4. The sheets 6 are preferably folded outwardly so as to move away from each other in moving away from the tube 1 (FIG. 4) and define a space for a universal joint J or the like which constitutes an articulation between said first steering shaft portion and a second steering shaft portion Sb, so that the pivot pin 7 of the tube 1 is coaxial with the articulation of the steering shaft portion. This articulation has not been shown in FIG. 4 so as to avoid complicating the latter.

At a point remote from the articulation pin 7, ie. in the vicinity of the steering wheel 2, the steering tube is rendered rigid, for example by welding, with a support plate 10 for associated control means, such as the wind screen wiper control, the headlight control or other controls, the actuating lever 11 or 13 of which may be shifted by the driver practically without losing contact with the steering wheel. The plate 10, in the same way as the associated control means, is displaced at the same time as the steering tube 1 when the latter is pivoted. However, a locking device is mounted between the plate 10 and the fixed support bracket 4 and enables these two elements to be immobilised with respect to each other. This device comprises a toothed sector 12 fixed to the end of the bracket 4 and perpendicular to the general plane of the latter, so that its series of teeth is substantially centered on the pivot axis of the column. The toothed sector 12 cooperates with a pawl 14 provided with a series of teeth 16 and pivotally mounted on a pin 15 parallel to the support plate 10 and perpendicular to the series of teeth of the sector 12. The pawl 14 has, on the side thereof opposed to the teeth 16, a curved generally concave surface 17 (FIG. 6) against which bears a lateral boss 19 of a pivotable cam 20 which pivots about a pin 23 parallel to the pin 15.

In fact, in the illustrated embodiment, the pivotable cam 20 and the pawl 14 are mounted between two parallel plates, only the plate 18 of which is shown in the drawings. This outer plate 18 is extended beyond the pawl 14 and constitutes a support surface for the toothed sector 12. The inner plate supports the pivot pin 15 of the pawl and the pivot pin 23 of the pivotable cam 20.

Figures 3, 4:
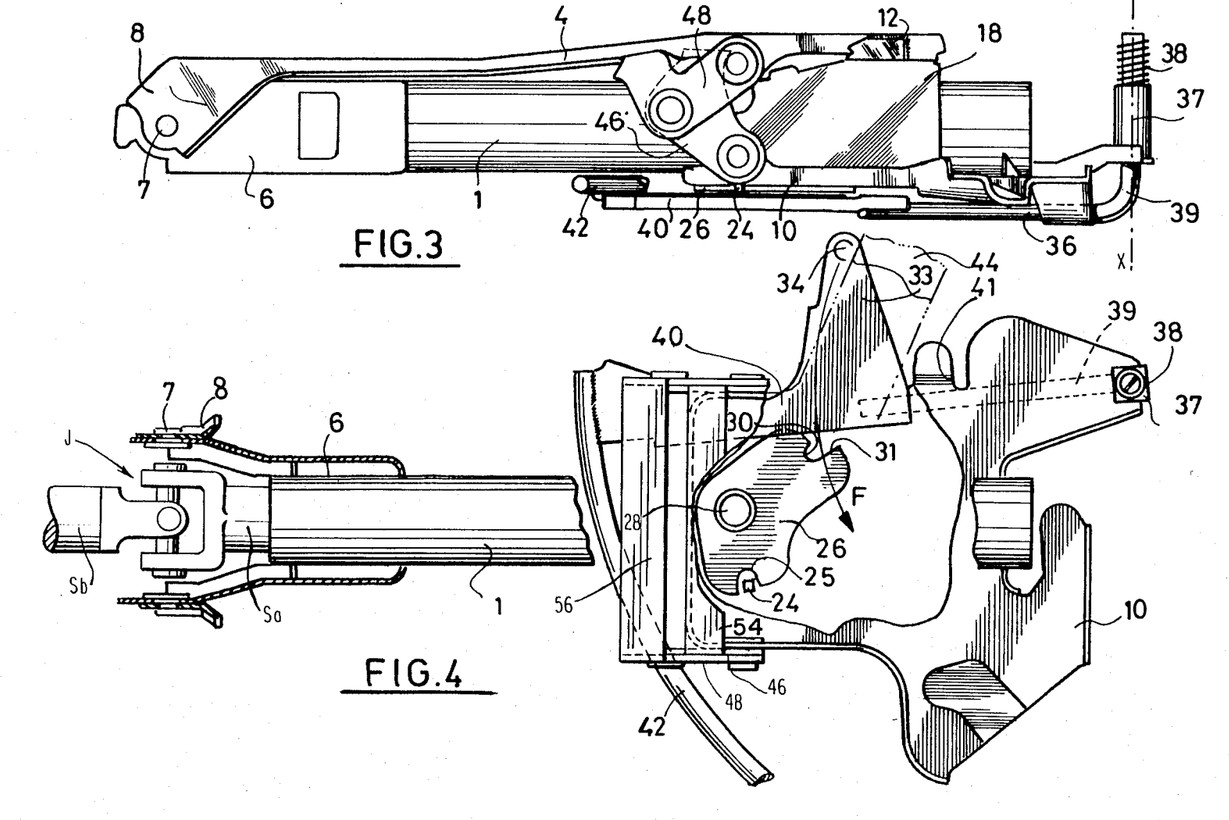
FIG. 3 is a side elevational view of the column alone.
FIG. 4 is a plan view of the column of FIG. 3 after removal of the support for fixing it to the vehicle and cutting away the column itself so as to show the unlocking control means.
Figure 6:
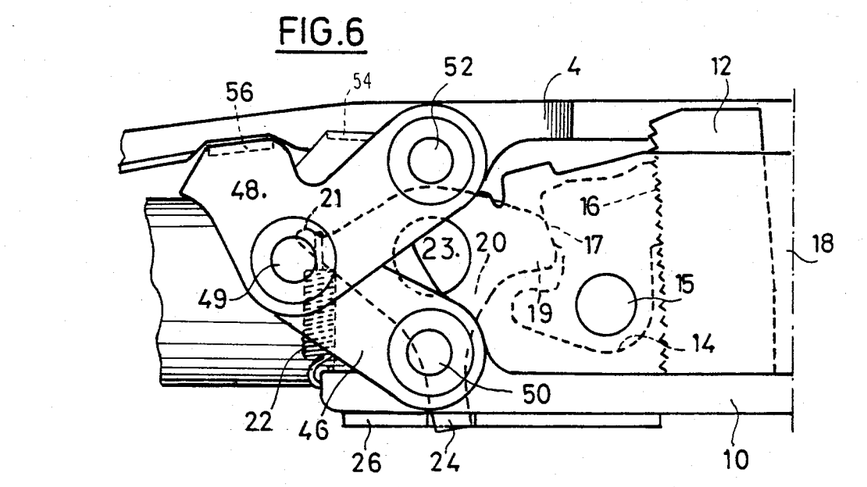
FIGS. 6 and 7 are partial side elevational views, to an enlarged scale, of the articulation of the column support means.

The cam 20 has a second lateral boss 21 which forms a hook for hooking an end of a spring 22 which is fixed at the end thereof opposed to the boss 21 to the support plate 10 and biases the hook 21 toward the plate 10, ie. urges the boss 19 toward the upper end of the surface 17 of the pawl 14 which results in the locking of the two series of teeth 16 and 12 as shown in FIG. 6. The cam 20 further comprises an arm 24 which extends through a slot in the plate 10 and projects from the latter. The end of the arm 24 is disposed in a notch 25 of a movable member in the form of a cam 26 of the locking device, which cam is generally parallel to the support plate 10 and pivots in a direction parallel to this plate about a pin 28 carried by the latter (FIG. 4). The cam 26 also has a second notch 30 at the end opposed to the notch 25. The notch 30 has a substantially semi-circular section but its lateral wall is extended on one of its sides by a projection 31 of the cam 26.

Figure 5:
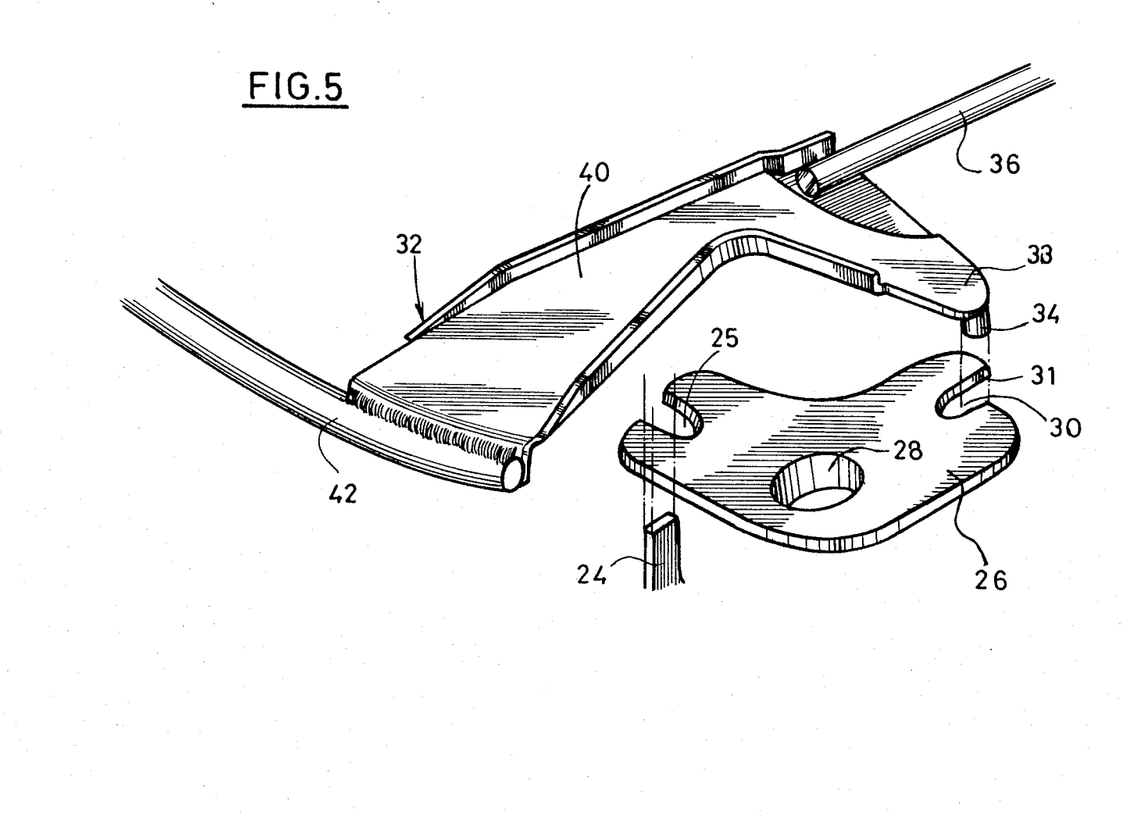
FIG. 5 is an exploded view, to an enlarged scale, of the unlocking means shown in FIG. 4.
Figure 8:
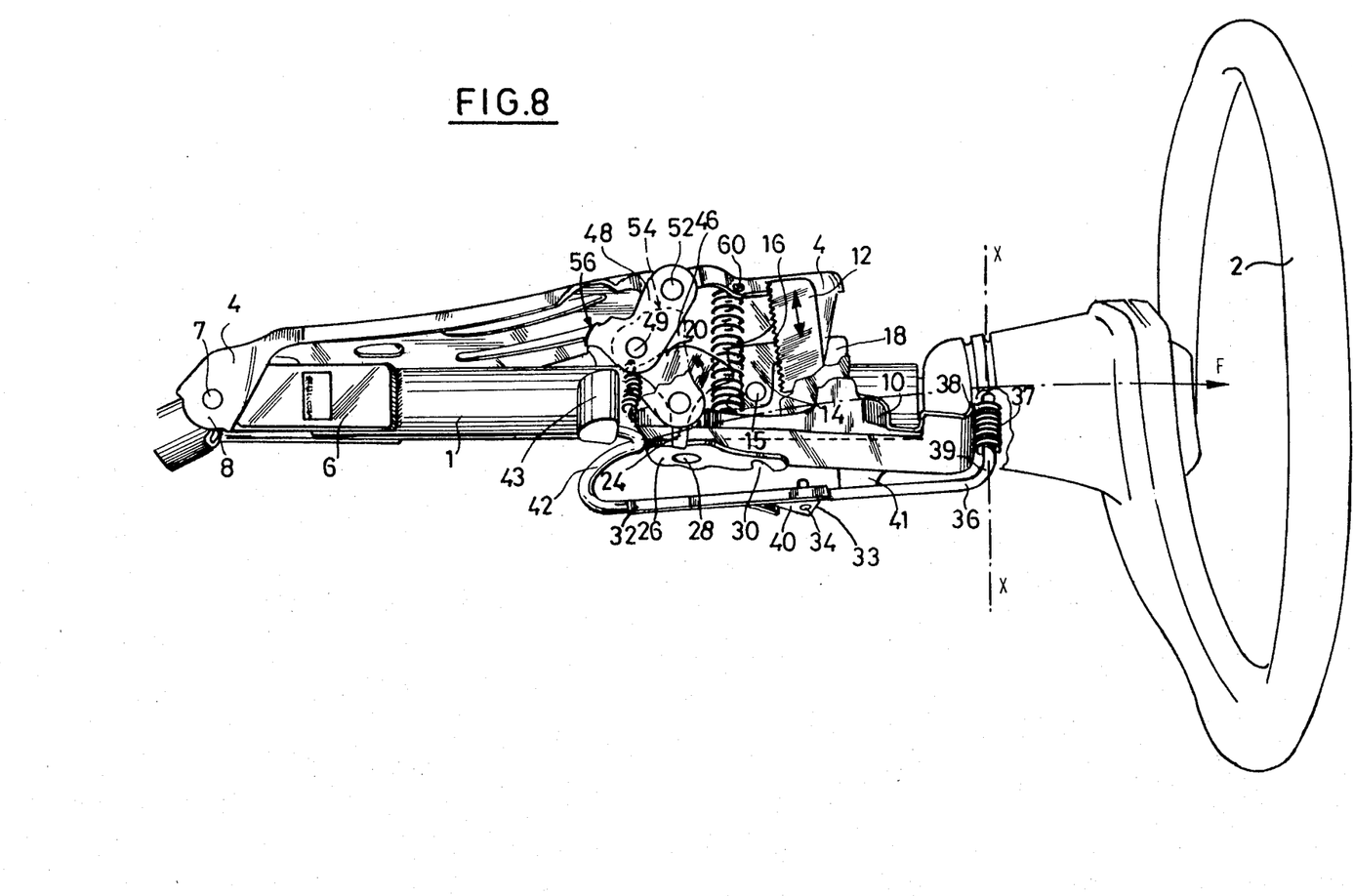
FIG. 8 is a perspective view of the interior of the whole of the height adjusting device from a viewpoint on one side of the steering column and a little below the unlocking control means.

The plate 10 further supports a cranked lever generally designated by the reference 32 and comprising an actuating arm 33 provided at its end with a projecting pin 34 which is capable of fitting in the notch 30 of the cam 26 (FIG. 5). The actuating arm 33 is fixed to a rod 36 which is upwardly bent at 39 so as to extend through the upper end portion of the plate 10 and a support bracket 37 fixed to this plate. Beyond this bracket 37, the rod 36 is surrounded by a coil spring 38 which has one end fixed to the bracket 37 and its other end blocked in a diametral slot of the rod 36. The arm 33 and the rod 36 can thus pivot about the axis X—X of the part of the rod which extends through the bracket 37 but are automatically returned to their position of rest, ie. in the position shown in FIG. 4, by the action of the spring 38. The actuating arm 33 is moreover rigid with an arm 40 which is substantially in alignment with the rod 36, the arm 40 being fixed to a curved rod 42 which preferably terminates in an actuating knob 43. The curvature of the actuating rod 42 is such that this actuating knob is normally a little further away from the steering wheel 2 than the levers 11 and 13 when in its position of rest shown in dot-dash lines in FIGS. 1 and 2, so that these levers can be used without hindrance, exactly in the conventional manner. However, as clearly shown in FIGS. 1 and 8, this distance is not very great and the hand of the driver, indicated at A in FIG. 1, has only to move a short distance in order to reach the rod 42.

Figure 1:
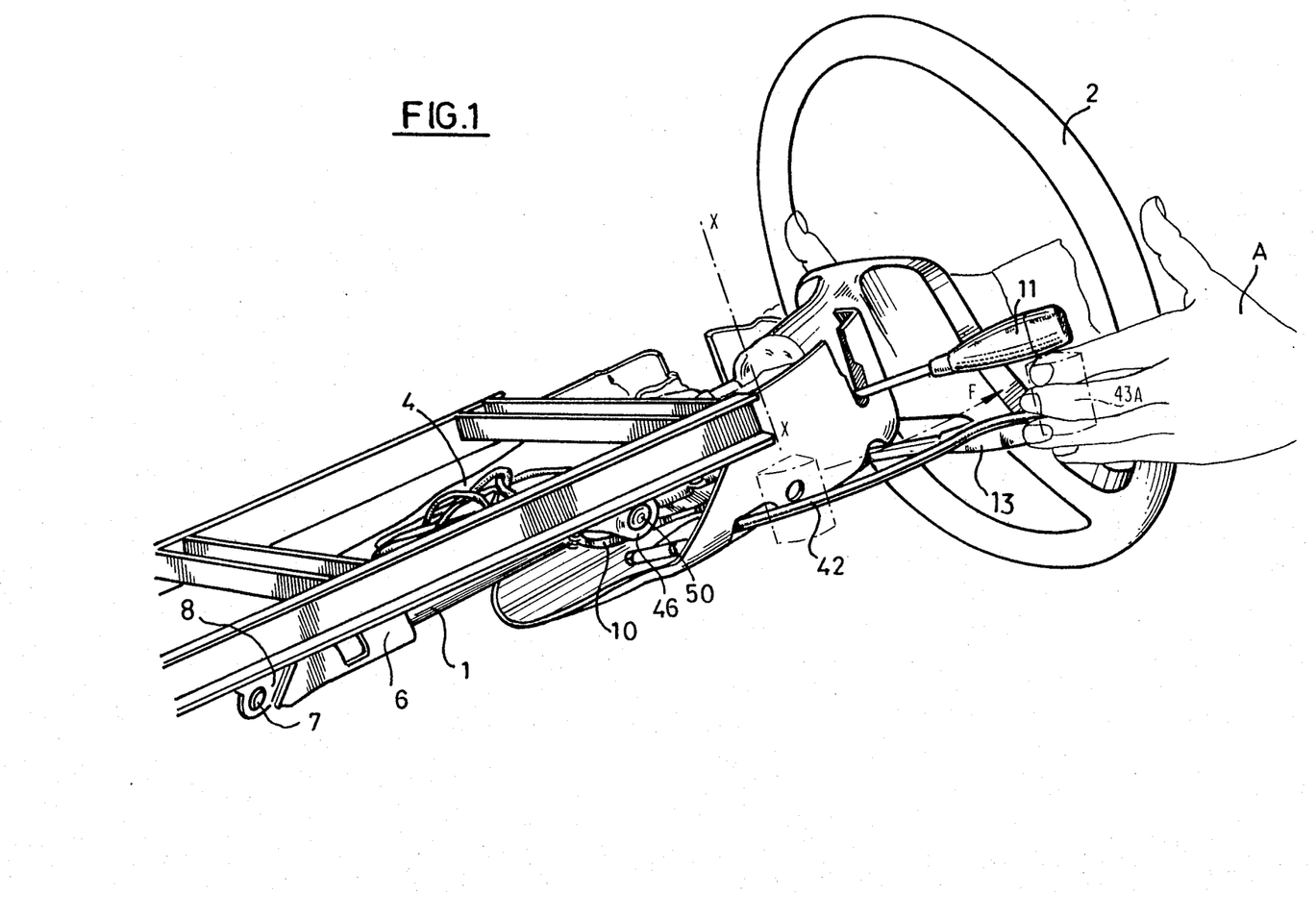
FIG. 1 is a perspective view of a steering column mounted on a vehicle and provided with accessory control means and a steering wheel height adjusting device, upon the actuation of the height adjusting device by the driver but before the steering wheel has been adjusted.
Figure 2:
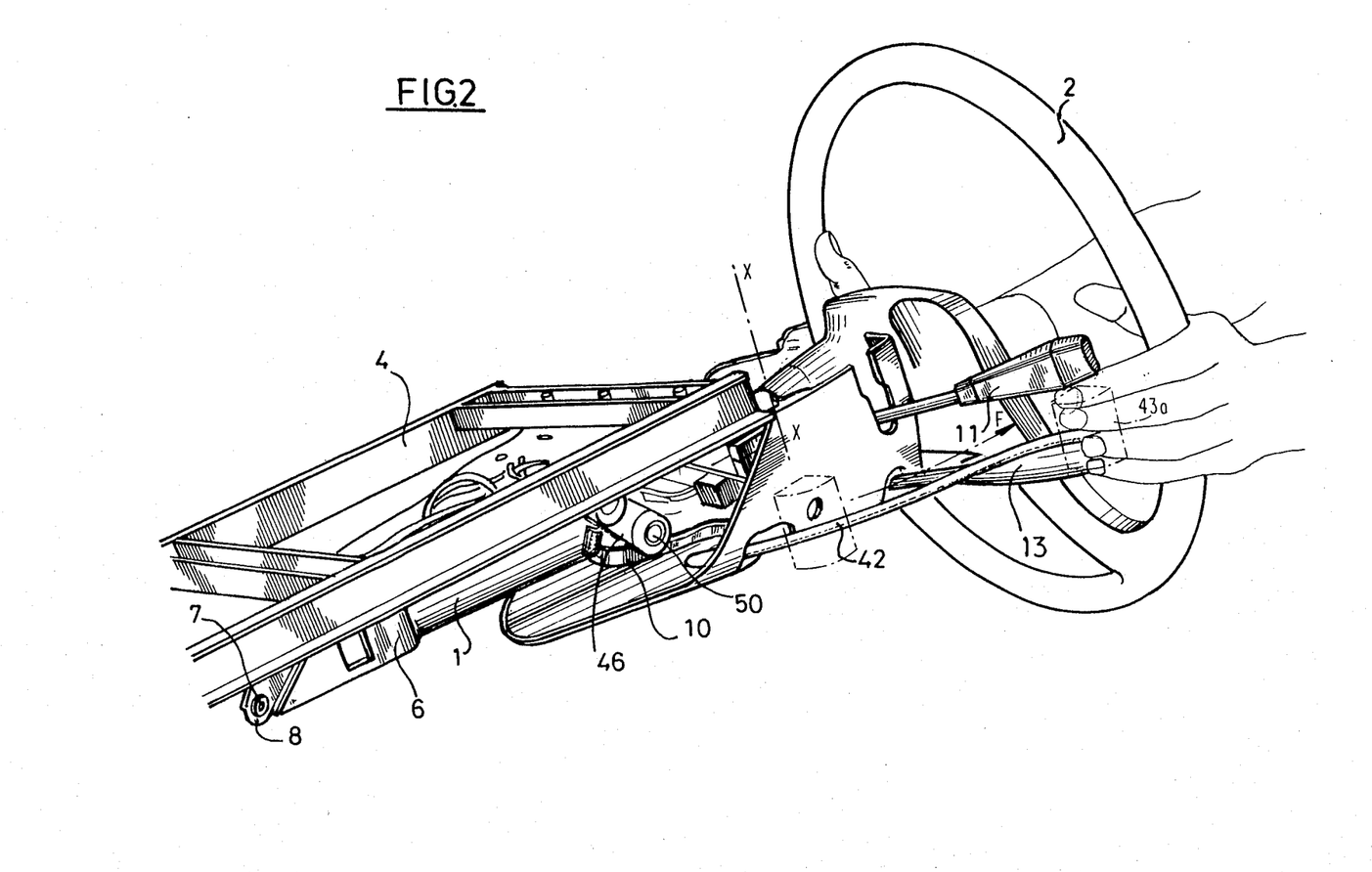
FIG. 2 is a view similar to FIG. 1 in the course of the adjustment in lowering, of the height of the steering wheel by the driver.

A pull on the actuating knob 43 causes the rod 42 and the whole of the lever 32 to pivot about the axis X—X of the bracket 37, ie. the axis of the part 39 of the rod 36 which extends through this bracket. This pivoting, which occurs in the direction of arrow F of FIGS. 1, 2, 4 and 8, brings the pin 34 of the actuating arm 33 into the notch 30 of the cam 26. At this moment, the actuating knob 43 of the rod 42 is near enough to the steering wheel 2 to enable the driver to place his hand again on the steering wheel in the position while holding this knob 43 corresponding to a normal driving position, as shown in FIG. 2. Further, the pin 34 has come in contact with the projection 31 of the cam 26 so that the continuation of the pivoting of the rod 42 about axis X—X urges the pin 34 against this projection 31 and pivots the cam 26 about the pin 28. This pivoting shifts the arm 24 of the pivotal cam 20 against the action of the spring 22. The boss 19 of this cam 20 travels in the concavity of the surface 17 and bears against the lower edge of this surface and pivots the pawl 14 about the pin 15. The set of teeth 16 leaves the set of teeth of the sector 12 and releases the locking of the plates 10 and bracket 4.

The steering column is then free to pivot about the pin 7 and the driver, in holding the steering wheel 2 in both hands, has merely to shift the steeping wheel to the position which he finds to be the most correct position as a function of his own position. As soon as this position has been reached, the knob 43 and consequently the actuating rod 42 are released and the spring 38 swings this rod about axis X—X and returns the lever 32 against a stop 41 of the plate 10. The pin 34, assisted by the spring 22, then pivots the cam 20 so that the arm 24 pivots the cam 26 while the boss 19 urges the set of teeth 16 to the locking position with the toothed sector 12. The whole of the steering column is in this way immobilised with respect to the support bracket 4 in the desired position and the knob 43 is in the position of rest shown in dot-dash lines in FIGS. 1 and 2 and in full lines in FIG. 8.

Thus the steering column has been adjusted by a driver who is exactly in the driving position without taking his hands of the steering wheel. Such an adjustment can thus be carried out exactly in accordance with the desired position of the driver. It may even be carried out at different times during the same journey if the nature of the itinerary requires different positions of the driver. In any case, the locking is automatically resumed as soon as the actuating rod is released. The auxiliary or accessory controls however remain just as accessible as if the adjusting device did not exist. In the same way, the steering column may carry a conventional anti-theft device which is mounted in a tube laterally fixed to the steering tube 1, as indicated at 44 in FIG. 4.

Figure 7:
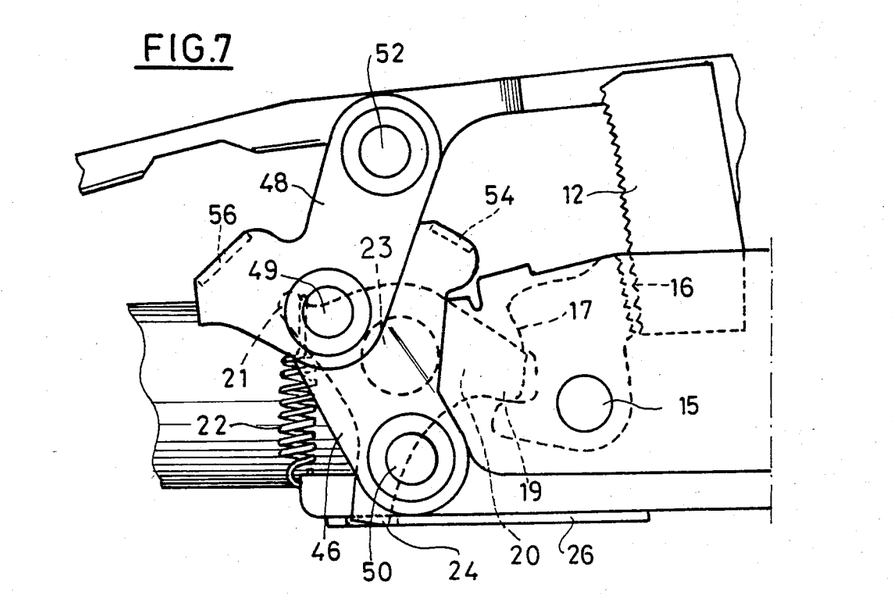

The strength of the steering column is however preferably reinforced by connecting the plate 10 to the support bracket 4 by two lateral articulated compass systems which are rendered rigid with each other by cross-members as shown in FIGS. 4 and 7. Each of the compass systems comprises two links 46 and 48 which are pivoted together at 49, the link 46 being further pivoted at 50 to the plate 10, while the upper link 48 is pivoted at 52 to the support bracket 44. Further, the two lower links 46 are rendered rigid with each other in the vicinity of their upper part by a cross-member 54 (FIG. 4), while the upper links 48 are interconnected in the vicinity of their articulation 49 by a cross member 56 (FIG. 4) which is slightly offset from the pivot pin 49. The articulation formed by the two compass systems interconnected by the cross-members 54, 56, impart to the whole of the steering column considerable stiffness against laterally exerted forces. Consequently, even when the pawl 14 is unlocked, the steering column remains stable.

Further, in the event of a shock or when an abnormal force is exerted on the anti-theft device, the articulations resist this shock or force and ensure that this force is not transmitted to the locking device and to the associated control means which would otherwise be liable to be damaged.

It will be understood that the modification in the height of the steering column may also be employed for facilitating access to the interior of the vehicle or leaving the latter, the actuating rod 42 being just as easy to shift under these conditions by acting on the knob 43.

Preferably, a spring 60 is mounted between the support plate 10 and the bracket 4 and biases these two parts toward each other, ie. relieves the articuation of the steering column of stress.

Having now described my invention what I claim as new and desire to secure by Letters Patent is:

1. A steering structure for a vehicle and comprising a steering column which has a tube, a first steering shaft portion within the tube, an articulation connecting the first shaft portion to a second steering shaft portion adjacent a lower end of the first steering shaft portion, a steering wheel mounted on the first steering shaft portion adjacent an end of the first steering shaft portion opposed to said articulation, a plate for supporting associated controls and rigid with the tube, a fixed support for fixing to said vehicle, the support plate being mounted on the fixed support to pivot about an axis coaxial with said articulation, a locking device for locking said plate with respect to said support, the locking device including a movable member which is movable between a first position in which the locking device is operative to lock said plate to said support and a second position in which the locking device is inoperative, a cranked unlocking lever which is pivotable substantially in a plane parallel to a plane containing said tube and extending laterally of said tube, from a position in which the unlocking lever is at rest and spaced away from said movable member of said locking device to a position of engagement with said movable member of said locking device, and then farther to an unlocking position for shifting said movable member to said second position thereof, and means for elastically biasing said lever from said unlocking position to said position of rest which position of rest corresponds to the locking of said plate by said locking device, said lever having an actuating knob which is spaced sufficiently away from said steering wheel to avoid hindrance to hands of the user on said steering wheel in said position of rest and is in closer proximity to said steering wheel in said position of engagement with said movable member so as to enable the user to bring said lever to said unlocking position thereof while maintaining his hands on the steering wheel.

2. A steering structure according to claim 1, wherein said unlocking lever is pivotable about an axis perpendicular to said plate and located in the vicinity of the steering wheel.

3. A steering structure according to claim 2, wherein said unlocking lever is pivotable about an axis which is embodied by a curved end portion of a rod which is rigid with said lever and extends through said plate, a return spring surrounding said curved end portion of said rod.

4. A steering structure according to claim 1, wherein the unlocking lever is rigid with a curved actuating rod which has an end portion which is, in said actuating position of rest of the unlocking lever, distinctly withdrawn from the steering wheel, the unlocking travel thereof being in the immediate vicinity of the steering wheel.

5. A steering structure for a vehicle and comprising a steering column which has a tube, a first steering shaft portion within the tube, an articulation connecting the first shaft portion to a second steering shaft portion adjacent a lower end of the first steering shaft portion, a steering wheel mounted on the first steering shaft portion adjacent an end of the first steering shaft portion opposed to said articulation, a plate for supporting associated controls and rigid with the tube, a fixed support for fixing to said vehicle, the support plate being mounted on the fixed support to pivot abut an axis coaxial with said articulation, a locking device for locking said plate with respect to said support, a cranked unlocking lever which is pivotable from a position in which the unlocking lever is at rest and spaced away from said locking device to a position of engagement with said locking device, and then farther to an unlocking position for unlocking said locking device, and means for elastically biasing said lever from said unlocking position to said position of rest which position of rest corresponds to the locking of said plate by said locking device, said unlocking lever comprising a lateral actuating arm and a pin which is carried by the actuating arm adjacent an end of the actuating arm, an unlocking cam being included in said unlocking device and said pin being spaced from said cam in said position of rest of said lever.

6. A steering structure according to claim 5, wherein said unlocking cam is pivotable in a direction parallel to itself, to said plate and to said lever and includes two end notches which respectively receive said pin of said actuating arm and an end portion of a pivotal element of said locking device.

7. A steering structure for a vehicle and comprising a steering column which has a tube, a first steering shaft portion within the tube, an articulation connecting the first shaft portion to a second steering shaft portion adjacent a lower end of the first steering shaft portion, a steering wheel mounted on the first steering shaft portion adjacent an end of the first steering shaft portion opposed to said articulation, a plate for supporting associated controls and rigid with the tube, a fixed support for fixing to said vehicle, the support plate being mounted on the fixed support to pivot about an axis coaxial with said articulation, a locking device for locking said plate with respect to said support, a cranked unlocking lever which is pivotable from a position in which the unlocking lever is at rest and spaced away from said locking device to a position of engagement with said locking device, and then farther to an unlocking position for unlocking said locking device, and means for elastically biasing said lever from said unlocking position to said position of rest which position of rest corresponds to the locking of said plate by said locking device, said locking device comprising a toothed sector which is substantially perpendicular to said fixed support and centered on said articulation of the steering column, and a toothed pawl engageable with said sector, a pivotal cam cooperative with the pawl for maintaining the pawl in engagement with said sector, the pivotal cam having an arm in a notch of an unlocking cam and being returned to the locking position by a spring.

8. A steering structure for a vehicle and comprising a steering column which has a tube, a first steering shaft portion within the tube, an articulation connecting the first shaft portion to a second steering shaft portion adjacent a lower end of the first steering shaft portion, a steering wheel mounted on the first steering shaft portion adjacent an end of the first steering shaft portion opposed to said articulation, a plate for supporting associated controls and rigid with the tube, a fixed support for fixing to said vehicle, the support plate being mounted on the fixed support to pivot about an axis coaxial with said articulation, a locking device for locking said plate with respect to said support, a cranked unlocking lever which is pivotable from a position in which the unlocking lever is at rest and spaced away from said locking device to a position of engagement with said locking device, and then farther to an unlocking position for unlocking said locking device, and means for elastically biasing said lever from said unlocking position to said position of rest which position of rest corresponds to the locking of said plate by said locking device, said steering structure further comprising a double compass system which is reinforced by rigid cross-members and interconnects said fixed support and said plate.

9. A steering structure according to claim 5, 7 or 8, wherein said unlocking lever is pivotable about an axis perpendicular to said plate and located in the vicinity of the steering wheel.

10. A steering structure according to claim 9, wherein said unlocking lever is pivotable about an axis which is embodied by a curved end portion of a rod which is rigid with said lever and extends through said plate, a return spring surrounding said curved end portion of said rod.

11. A steering structure according to claim 5, 7 or 8, wherein the unlocking lever is rigid with a curved actuating rod which has an end portion which is, in said position of rest of the unlocking lever, distinctly withdrawn from the steering wheel, the unlocking travel thereof being in the immediate vicinity of the steering wheel.

* * * * *